United States Patent [19]

Bihlmaier

[11] Patent Number: 4,647,004

[45] Date of Patent: Mar. 3, 1987

[54] PNEUMATIC-HYDRAULIC ACTUATOR SYSTEM

[76] Inventor: John A. Bihlmaier, 840 N. Maplewood St., Orange, Calif. 92667

[21] Appl. No.: 376,922

[22] Filed: May 10, 1982

Related U.S. Application Data

[62] Division of Ser. No. 839,924, Oct. 6, 1977, Pat. No. 4,335,867.

[51] Int. Cl.[4] ..................... F15B 13/042; F15B 13/16; F16K 31/124

[52] U.S. Cl. ........................................ 251/28; 60/388; 60/403; 60/406; 91/6; 91/20; 91/31; 91/33; 91/388

[58] Field of Search ................. 60/384, 388, 403, 406, 60/416, 903; 91/6, 20, 31, 33, 358 R, 360, 361, 384, 388, 469; 137/625.63; 251/28, 29, 57

[56] References Cited

U.S. PATENT DOCUMENTS

| | | | |
|---|---|---|---|
| 2,618,243 | 11/1952 | Tregandwan | 91/31 |
| 2,649,841 | 8/1953 | Jacques | 91/33 |
| 2,726,858 | 12/1955 | Charigie | 91/358 R |
| 2,780,204 | 2/1957 | Barley | 91/6 |
| 2,800,921 | 7/1957 | Wright | 60/406 |
| 2,886,009 | 5/1959 | Myers | 91/360 |
| 2,918,085 | 12/1959 | Govan et al. | 60/393 |
| 2,938,347 | 5/1960 | Sturgis | 60/456 |
| 2,947,285 | 8/1960 | Baltus et al. | 92/151 |
| 2,974,639 | 3/1961 | O'Connor et al. | 91/388 |
| 2,989,950 | 6/1961 | Lockman | 91/388 |
| 2,999,482 | 9/1961 | Bower | 91/6 X |
| 3,433,126 | 3/1969 | Hayner et al. | 91/388 |
| 3,468,126 | 9/1969 | Mercier | 91/388 |
| 3,603,083 | 9/1971 | Coursen | 60/403 |
| 3,635,020 | 1/1972 | Mahlmann | 91/6 X |
| 3,680,311 | 8/1972 | Harbonn | 60/404 |
| 3,805,727 | 4/1974 | Seto | 91/388 X |
| 3,872,773 | 3/1975 | Denker | 91/388 |
| 4,037,519 | 7/1977 | Miller et al. | 91/361 |
| 4,043,533 | 8/1977 | Cowley | 251/57 |
| 4,046,099 | 4/1977 | Leonard | 91/388 |
| 4,114,637 | 4/1978 | Johnson | 251/29 |
| 4,136,600 | 1/1979 | Herser | 91/31 |

FOREIGN PATENT DOCUMENTS

| | | | |
|---|---|---|---|
| 542831 | 6/1957 | Canada | 91/31 |
| 1431599 | 4/1976 | United Kingdom | 91/31 |

*Primary Examiner*—George L. Walton

*Attorney, Agent, or Firm*—Lyon & Lyon

[57] ABSTRACT

An actuator system is disclosed which modulates a linear output shaft associated with a working control valve or the like in response to a control signal input. The system includes a feedback control link, a pneumatic positioner, a pneumatically controlled hydraulic valving system and a hydraulic cylinder and piston assembly controlled by the hydraulic valving system. The hydraulic valving system includes a three-position, four-way valve actuated by pneumatic binary output signals from a signal conditioner which is in turn controlled by the positioner. Hydraulic flow to the three-position, four-way valve may also be controlled from the signal conditioner in response to positioner output for most effective actuation of the hydraulic cylinder and piston assembly. Failure modes are also disclosed with the present system. The resulting system exhibits extremely rapid response times and high accuracy with dynamic stability.

5 Claims, 4 Drawing Figures

PNEUMATIC-HYDRAULIC ACTUATOR SYSTEM

This is a division of application Ser. No. 839,924, filed Oct. 6, 1977, now U.S. Pat. No. 4,335,867.

BACKGROUND OF THE INVENTION

The present invention relates to feedback control systems for controlling the position of a working valve or the like. More specifically, the present invention is directed to a pneumatically actuated and hydraulically driven control system.

Feedback control systems employed for the actuation and positioning of a working valve or the like have included pneumatic systems, hydraulic systems and electro mechanical systems. Each of these types of systems have particular advantage under some conditions. However, each of these types of systems also exhibit characteristic practical deficiencies.

Pneumatic systems are convenient in the sense that many industrial plants, refineries and power plants distribute pressurized shop air for power equipment and control signals. Pneumatic systems do not require return lines, are generally fire safe and the supply is easily distributed. However, pneumatic systems often experience dynamic instability because of the compressible nature of the control and working fluid. Furthermore, with many systems, volumetric efficiency is relatively low resulting in power inefficiencies and extended response times. The compressible nature of the pneumatic fluid does allow faster movement of components under a low load condition; however, once a high load is experienced, time is lost building the needed pressure in a large cavity. Pneumatic pressures are also normally kept low relative to hydraulic pressures in comparable hydraulic systems. This increases the size of the pneumatic system because of the additional work area required to offset the low pressure.

Hydraulic systems on the other hand do not suffer from compressible fluid dynamic instability. Even with a hydraulic system shut down where only low pressures remain in hydraulic cylinders, accurate retention of driven components is possible, again because of the incompressible nature of the fluid. Furthermore, high pressures can be employed which reduces the size of the operating equipment. However, hydraulic fluids are often not fire proof and hydraulic systems are notorious for leakage and high maintenance, particularly in control applications. Hydraulic systems employing proportional devices can experience overheating of the hydraulic fluid, fluid breakdown, and eventual destruction of components because of high pressure loss from internal leakages through small orifices under low demand and static conditions. The ability of the hydraulic fluid to carry peak pressures and shocks throughout the hydraulic system often also results in component failure. Thus, like pneumatic systems hydraulic systems have characteristic advantages and disadvantages inherent in the nature of the fluid and the apparatus.

Electro mechanical as well as electro pneumatic and electro hydraulic systems also characteristically exhibit advantages and disadvantages. The electrical components associated with such systems are often subject to electronic interference. Electrical systems are often subject to sparking which can, in many circumstances, create a very hazardous condition from fire. With mechanical systems, motor drives react slowly, mechanical springs change spring rate with use and bearings wear while in hydraulics and pneumatics these conditions can be avoided. Failure modes for mechanical systems generally requires a significant amount of additional equipment depending on the failure mode selected. It can be seen from the foregoing, that many disadvantages are inherent in the various types of feedback control systems; and the type of system is often selected to avoid the disadvantages of another, otherwise better suited type of system.

SUMMARY OF THE INVENTION

The present invention is directed to a feedback control system which employs both pneumatic and hydraulic apparatus to achieve maximum benefit from each without incurring the characteristic disadvantages. Where a quick, low load response is needed in a signal pilot system, pneumatics are employed. Thus, hydraulic leakage and high maintenance are avoided. A pneumatic positioner is employed to receive and compare feedback information through a feedback link with signal information from a signal input line. Pneumatic signals responsive to these inputs provide valve control for the main working system. To provide more accurate response and to avoid problems of dynamic instability from compressible pneumatic fluids, the signals from the positioner are conditioned for use in a binary, on-off, system. Amplifier circuits in the pneumatic system provide a ready source of power for shifting hydraulic valves. As the pneumatic pilot system of the present invention employs binary output control to the hydraulic valves using low force control components, a compact, fire safe and dynamically stable system is realized without hydraulic leakage and high maintenance.

The overall system is also well suited to employ the maximum benefits from a hydraulic system without incurring the characteristic deficiencies thereof. The hydraulic system is employed to provide the work of the actuator system through a hydraulic cylinder and piston assembly. Employment of hydraulics in this portion of the system eliminates position instability of the force producing cylinder and piston assembly which is inherent with pneumatic cylinders. The pneumatic system, using binary control, actuates a three-position, four-way valve controlling hydraulic flow to the working hydraulic cylinder. This combination avoids characteristic hydraulic control valve cross-port leakage and high maintenance by elimination of all but the most basic hydraulic equipment, a pump, hydraulic line, simple valves and a hydraulic cylinder. The system also incorporates a pneumatically controlled mechanism for increasing the amount of hydraulic flow to the hydraulic cylinder when large imbalances between the feedback link and the input signal are sensed by the positioner.

The binary application of pneumatic signals from the signal conditioner not only eliminates instability in control of the hydraulic system, the on-off operation prevents high pressure—low volume hydraulic flows under conditions where valves are barely open which is a condition that is a major source of hydraulic fluid heating, fluid breakdown and component erosion. The power use of the present system is also reduced because of the binary operation of the pneumatic control system.

The pneumatic-hydraulic combination provided by the present invention allows shop air to be employed in creating the working hydraulic pressure. An air powered, fixed displacement pump operates only on demand to provide proper hydraulic pressure to the hydraulic system. As the hydraulic system is thus contained within the actuator system, hydraulic fluid need not be conveyed through the plant.

The actuator system of the present invention also has the capability of providing failure modes designed to position the output shaft in a fully open, fully closed or unchanged position with the loss of pneumatic pressure. Again, this is accomplished through the use of both pneumatic and hydraulic systems by the present invention. When the pneumatic system loses pressure, the stored energy in the hydraulic system may be used to make a final positioning of the output mechanism of the actuator system.

In view of the foregoing, it is an object of the present invention to provide an actuator system advantageously employing both pneumatics and hydraulics to accomplish the control of an output shaft.

It is another object of the present invention to provide an improved feedback control system for an actuator mechanism.

It is a further object of the present invention to provide a feedback control actuator system having preselected failure modes.

Other and further objects and advantages will appear hereinafter.

DETAILED DESCRIPTION OF THE PREFERRED EMBODIMENT

Before turning in detail to the components of the preferred embodiment, a short overview is here presented. The present invention incorporates a pneumatic system as well as a zero leak hydraulic system in accomplishing such control. A pneumatic positioner is employed to sense the control input signal and the position of the controlled valve. This information input into the positioner is compared, and when the controlled valve position varies from the input signal, one or the other of two positioner output lines is pressurized to correct the disparity. A signal conditioner receives these output signals from the positioner. The signal conditioner performs the functions of allowing the positioner to be set for minimum deadband, adjustably amplifying the positioner output signals, and providing one or more auxiliary output signals responsive to preselected pressure magnitudes of the signals from the positioner.

The zeroleak hydraulic system is most advantageously driven by an air-powered fixed-displacement pump. This pump and associated accumulator and hydraulic reservoir function to drive a hydraulic cylinder and piston assembly through a pneumatically actuated three-position, four-way valve. The hydraulic cylinder and piston assembly provides the actuation of the controlled working device.

The pneumatically-actuated three-position, four-way valve controlling the hydraulic cylinder and piston assembly is in turn controlled by the positioner through the signal conditioner. The output signals from the positioner, as conditioned, are used in a binary application to the four-way valve to control pressurized hydraulic fluid to one side or the other of the hydraulic piston. The auxiliary output of the signal conditioner responsive to high-pressure signals from the positioner is used to control, in step function, the flow rate of hydraulic fluid to the four-way valve and subsequently to the hydraulic cylinder and piston assembly. To complete the system, a feedback link is associated with the linear output of the hydraulic cylinder and piston assembly to provide feedback information to the positioner.

Figure 1:
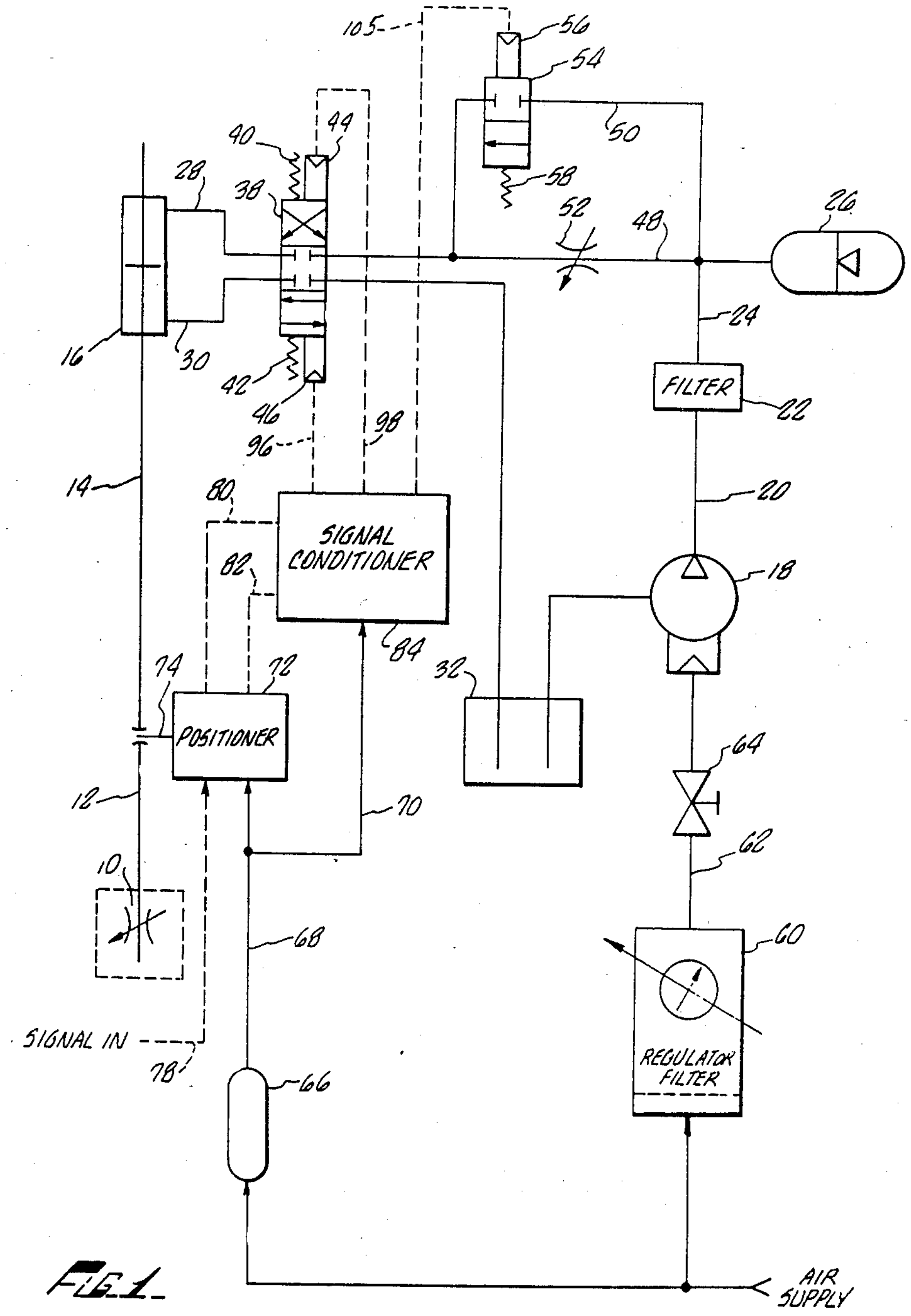
FIG. 1 is a schematic representation of a feedback control system of the present invention as employed to position and actuate a working valve.

Looking now in detail at the system, FIG. 1 provides one preferred embodiment in schematic form. The controlled apparatus modulated by the present system is shown here to be a working control valve 10. The working control valve 10 is associated by means of a valve stem 12 and a linear output shaft 14 with a hydraulic cylinder and piston assembly 16. This assembly 16 operates in a conventional fashion as a hydraulically actuated piston means to forcefully position and control the working control valve 10. The employment of a hydraulic cylinder and piston assembly is advantageous in the applications contemplated by the present invention because of the incompressible nature of the hydraulic fluid. Whether the hydraulic cylinder assembly 16 is acting to hold the working control valve in a fixed position or acting to move it to a new position, the incompressible nature of the hydraulic fluid ensures minimum deviation from the controlled position regardless of anomalies in the responsive forces of the controlled valve.

The hydraulic cylinder assembly 16 is hydraulically powered by an air-driven fixed-displacement pump 18. The employment of a fixed-displacement pump is advantageous in the present application because no pressurized air is consumed with the pump in a stalled condition. One example of such a pump is the Haskel Model PW-B35 Hydraulic Pump. A major advantage of such a fixed-displacement pump is that no control is needed to activate the pump when more hydraulic pressure is needed. The pump simply stalls when no further hydraulic pressure is required.

The air-driven fixed-displacement pump 18 provides hydraulic fluid on demand through a hydraulic feed line 20, a filter 22, and a filtered feed line 24 to an accumulator 26. The pressurized hydraulic fluid from both the air-driven fixed-displacement pump 18 and the accumulator 26 is directed by means of a feed line assembly to a valve means which selectively provides communication of the pressurized hydraulic fluid to the hydraulic cylinder and piston assembly 16 through hydraulic cylinder input lines 28 and 30. A hydraulic reservoir 32 is employed to form a source and sink for hydraulic fluid. An exhaust line 34 communicates exhausted hydraulic fluid from the hydraulic cylinder and piston assembly 16 to the hydraulic reservoir. A hydraulic fluid supply line 36 communicates hydraulic fluid to the air-driven fixed-displacement pump 18. The air-driven fixed-displacement pump 18, the accumulator 26, the hydraulic reservoir 32, and their related hydraulic lines provide a hydraulic source means for the selectively actuated hydraulic cylinder and piston assembly 16 supplying pressurized hydraulic fluid and receiving exhausted hydraulic fluid therefrom.

To selectively provide hydraulic pressure to the hydraulic cylinder and piston assembly 16 for actuation thereof, a valve means is provided between the feedline assembly and the hydraulic cylinder input lines 28 and 30. This valve means is provided in the present embodiment by a pneumatically actuated three-position, four-way valve 38. As schematically shown, the three-position, four-way valve includes an off position where hydraulic fluid can neither enter nor leave the hydraulic cylinder input lines 28 and 30 and cannot circulate through the fixed displacement pump 18. Two open positions are provided to alternately direct the pressurized hydraulic fluid to one or the other of the hydraulic cylinder input lines. Spring means in the form of mechanical compression springs 40 and 42 operate to bias the valve 38 to the off position.

Pneumatic pilots 44 and 46 are positioned to overcome the spring bias to force the valve 38 to one or the other of the open positions. Thus, by actuating the upper pneumatic pilot 44, hydraulic pressure is delivered to the lower input line 30 to force the piston of the hydraulic cylinder and piston assembly 16 upwardly. Actuation of the pneumatic pilot 46 will result in the opposite effect. When the pneumatic pilots 44 and 46 are not activated, the four-way valve 38 hydraulically locks the piston of the hydraulic cylinder and piston assembly 16 in place.

Hydraulic fluid is provided from the accumulator 26, and the air-driven fixed-displacement pump 18 to the pneumatically actuated three-position, four-way valve 38 by means of the feed line assembly. The feed line assembly in the embodiment of FIG. 1 employs two feed lines 48 and 50 in parallel. The first feed line 48 is shown to include an adjustable flow control valve 52 to provide a means for restricting flow therethrough. By means of the adjustable flow control valve 52, flow to the hydraulic cylinder and piston assembly is thus restricted to obtain an acceptable actuation speed by the hydraulic cylinder and piston assembly 16.

The second feed line 50 is coupled before and after the adjustable flow control valve 52 to form a parallel flow circuit. The second feed line 50 includes a two-way valve 54 which employs two positions, an open position and an off position, to provide binary regulation of this second feed line 50. A pneumatic pilot 56 is employed to selectively overcome a mechanical compression spring 58 to select one of the two positions. In the schematic diagram of FIG. 1, the two-way valve 54 is shown to be a normally on valve with the pneumatic pilot 56 maintaining the valve in the off position during normal operation. Naturally, this valving arrangement may be reversed with the employment of a normally off valve.

Figure 4:
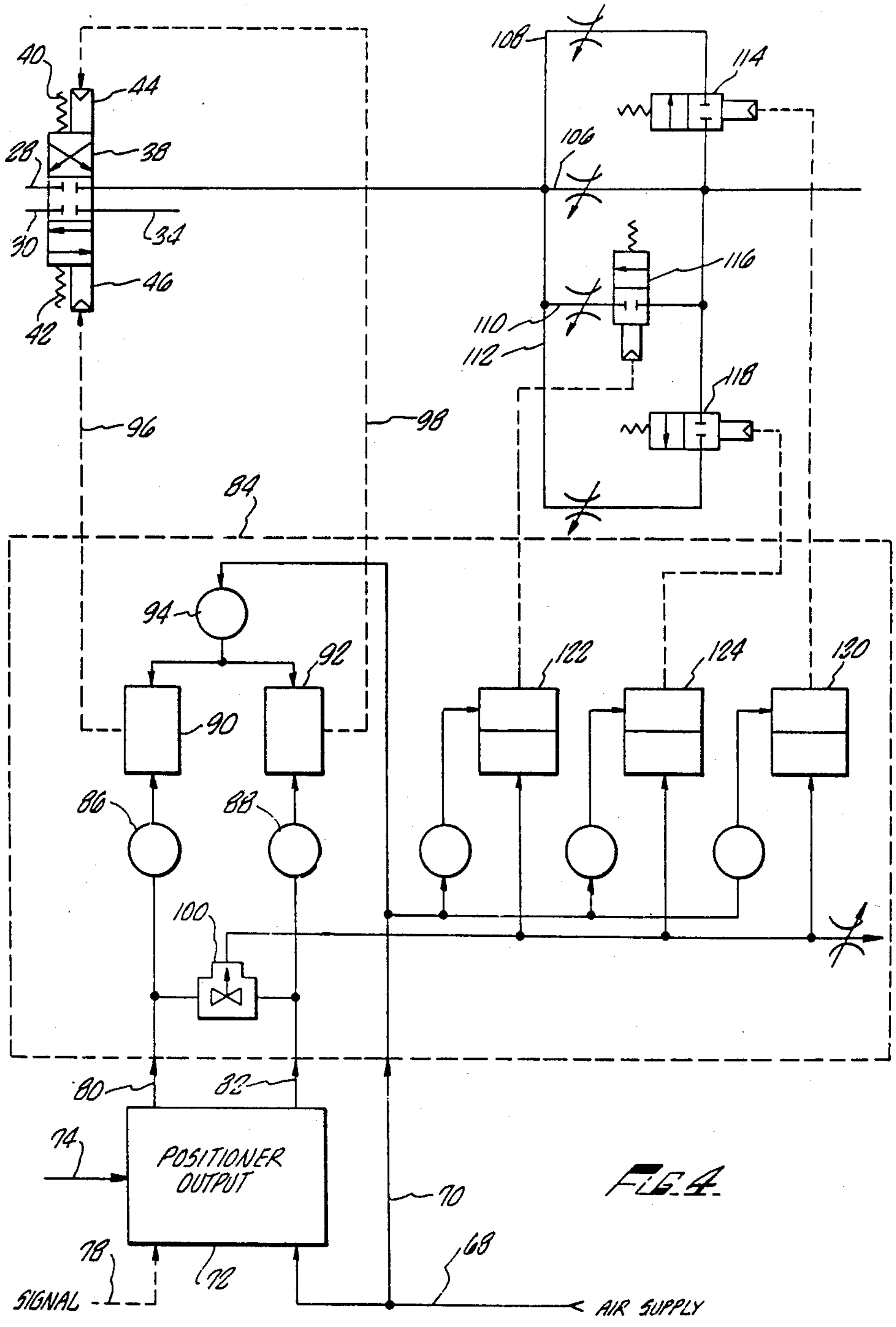
FIG. 4 is a schematic representation of a variation on the system as represented in FIG. 1 to include a number of hydraulic flow rates to the hydraulic cylinder and piston assembly.

As will be fully discussed below, the second feed line 50 may be advantageously employed to provide an additional flow of hydraulic fluid to the hydraulic cylinder and piston assembly 16. Under such employment, the two-way valve 54 is controlled to allow flow through the second feed line 50 when it would be advantageous to provide a higher velocity of the piston in the hydraulic cylinder and piston assembly 16. Such high-speed actuation would be beneficial when a large change must be made by the hydraulic cylinder and piston assembly 16. As the piston approaches the desired position, the two-way valve 54 may again be actuated to close off the second feed line 50 to prevent overshoot of the desired control position. Any number of combinations of feed lines with valves may be employed to achieve this result. In FIG. 4, a number of feed lines are illustrated to provide a more continuous relationship between the amount of flow to the hydraulic cylinder and piston assembly 16 and the distance of the piston of that assembly 16 from its desired null position.

It can be seen from the foregoing that the hydraulic system incorporates components having zero leak capabilities and requiring low maintenance. All control functions are accomplished by the pneumatic system discussed below. Thus, many of the objections to a hydraulic actuator system are avoided while the advantages of a dynamically stable, hydraulically-actuated piston means is retained. The employment of valve mechanism such as the pneumatically actuated three-position, four-way valve 38 and the pneumatically actuated two-way valve 54, both employing a mode of operation where they are either fully onor fully off, is beneficial to the operation of the hydraulic system. The normally restricted flow of proportional hydraulic systems generally encounters hydraulic fluid heating, leakage, high maintenance and component erosion and failure. With the substantially unrestricted hydraulic flow in the hydraulic system of the present invention, elevated hydraulic temperatures, hydraulic fluid breakdown and the like are avoided. This valving arrangement further enhances the overall operation of the actuator system because the outputs of the pneumatic system are employed in a binary application. As a result, the dynamic instability characteristic of pneumatic systems is avoided.

Looking next to the pneumatic portion of the actuator system, a supply of compressed air, as shown in FIG. 1, is directed to a regulator filter and to an air reservoir. The regulator filter 60 controls the pressure of the air supply such that the air-driven fixed-displacement pump 18 will achieve a desired output pressure in the hydraulic fluid. The regulator 60 is associated with the air side of the air-driven fixed-displacement pump by means of an air supply line 62 and a hand valve 64. The air supply also supplies the air reservoir 66 which in turn supplies a pneumatic positioner with compressed air via air supply line 68 and the signal conditioner via air supply line 70.

A pneumatic positioner system is incorporated in the present invention to control the hydraulic actuator system. The pneumatic positioner system includes a pneumatic positioner 72. Pneumatic positioners contemplated for use in the preferred embodiment are well known in the pneumatic feedback control system art. One such pneumatic positioner contemplated to be employed with the present invention is the Moore Model 74 Valve Positioner and Motion Transmitter. Such pneumatic positioners include a feedback link, schematically illustrated in FIG. 1 as a lever 74 attached to the linear output shaft 14 of the hydraulic cylinder and piston assembly 16, signal input means, schematically illustrated in FIG. 1 as pneumatic control line 78, and two positioner output signal lines 80 and 82.

A diaphragm mechanism having an enclosed cavity on one side and a range spring hooked thereto is employed in such positioners to compare the pneumatic input signal received by the closed cavity with the feedback link which is attached to the range spring. When the range spring and the diaphragm are under unbalanced forces, linkage associated with the diaphragm causes a detector nozzle to be opened or closed. This change in the detector nozzle changes the balance in a valve which results in compressed air being provided to one positioner output signal line while the other positioner output signal line is exhausted.

The overall effect of such a conventional system is to compare an input signal with the linear output shaft and respond to any imbalance by providing a pressure differential across the two positioner output signal lines. The normal function of such positioners is to directly drive a pneumatic piston. The positioner is not employed in this manner by the present invention.

One further feature conventionally employed on such positioners is an adjustment allowing balanced pressure at other than zero gauge pressure be provided to both positioner output signal lines at the null condition. It is generally recommended that such positioners be operated at a null pressure of around 75 percent of the total available pressure. By the present invention and because of the unique service to which the positioner 72 is put, the positioner 72 may be advantageously, though not necessarily, set at zero gauge pressure for the null condition. By establishing null at zero gauge pressure, static leakage is avoided. Furthermore, the dead band of such a system is typically very small at zero gauge pressure. Null at zero gauge pressure is not employed in conventional systems because the response time becomes very slow. At zero pressure, no power is available in the fluid for actuating the controlled device. Consequently, pressure must be built up before any change occurs in such conventional systems. By the present invention, low pressures can be employed as working pistons and the like are not driven directly from the positioner 72.

The positioner system also includes a signal conditioner 84. An air supply line 70 provides pneumatic pressure to the signal conditioner 84 and positioner signal output lines 80 and 82 are also directed to the signal conditioner 84. In the preferred embodiment, the signal conditioner 84 performs three functions. First, the signal conditioner 84 makes possible a faster initial system response to imbalances detected by the positioner 72. Second, the signal conditioner provides an amplified output of the positioner signals. This amplified output is in a binary form in the sense that it is either full on or full off. Third, the signal conditioner provides an auxiliary output signal or signals responsive to preselected pressure levels of the positioner output signals which are indicative of large imbalances between the system control signal and the feedback response.

Figure 2:
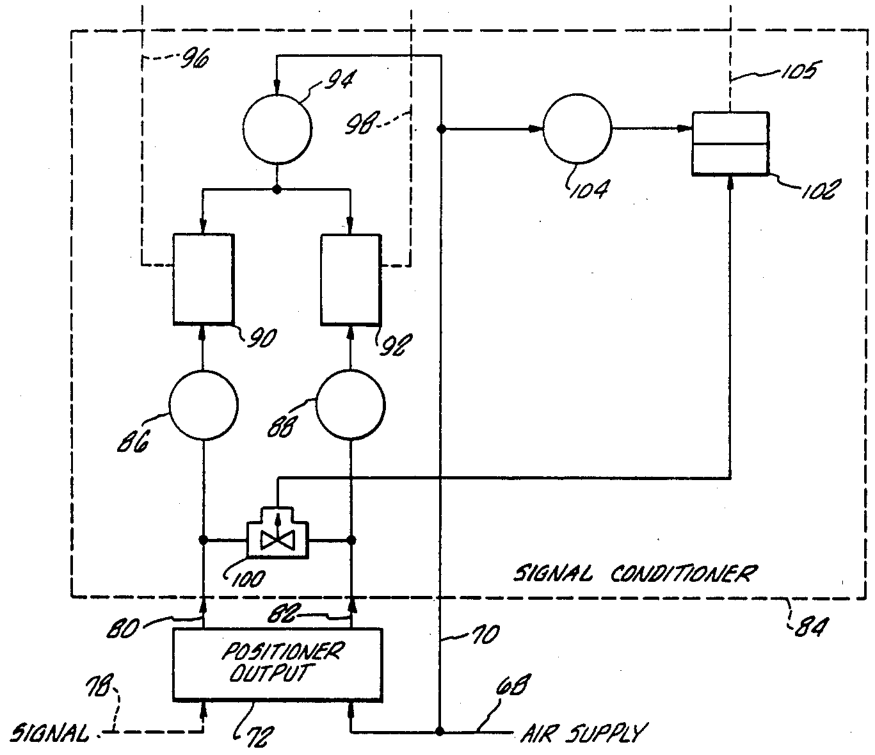
FIG. 2 is a schematic representation of a signal conditioner of the present invention employed in the system represented in FIG. 1.

The signal conditioner 84 seen in FIG. 2 makes possible a rapid initial system response by allowing the positioner 72 to be set at zero pressure output at the positioner null and by amplifying the very low pressures received when a system imbalance is experienced. In accomplishing this response, sensitive equipment is advantageous. Consequently, positioner signal regulators 86 and 88 are employed to limit the output the positioner 72 from the positioner output signal lines 80 and 82 to the amplifier valves 90 and 92. With a pressure source of up to 300 psig, the regulators only allow a maximum of five psig in the described embodiment.

The pilots 44 and 46 may require upwards of 20 psig for rapid and reliable actuation. To accommodate a rapid response to minimal outputs from the positioner, requiring sensitive equipment, and to accommodate the relatively less sensitive pilots 44 and 46, amplifiers 90 and 92 are provided. The amplifiers 90 and 92 are driven by substantially less than five psig yet can easily control the supply pressure of up to 100 psig. Thus, the minimal outputs from the positioner 72, adjusted to pressure output at the null position where the positioner dead band is the smallest, can be easily and rapidly sensed and the pilots 44 and 46 activated.

In operation, signal pressures from the positioner 72, as controlled by the positioner signal regulators 86 and 88, actuate the amplifier valves 90 and 92. The air supply line 70 provides pressurized air to an air supply regulator 94 which in turn supplies regulated compressed air to each of the amplifier valves 90 and 92. The air supply regulator 94 operates to control the maximum amount of air pressure transmitted by the amplifier valves 90 and 92. Upon actuation by a signal from the positioner 72 through either one of positioner signal output lines 80 and 82, the regulated compressed air from the air supply line 70 is communicated to one of two positioner system output signal lines 96 and 98. The effect of the foregoing elements in the signal conditioner is to create a binary output to the positioner system output signal lines 96 and 98. These output lines either see zero gauge pressure when the amplifier valves 90 and 92 are closed, or they see the full regulated air pressure from the air supply. Thus, the positioner system output signals through lines 96 and 98 are either full on or full off.

The conditioned positioner output signals directed through lines 96 and 98 are communicated thereby to the pneumatic pilots 44 and 46 on the pneumatically actuated three-position, four-way valve 38. In operation, when the positioner registers little or no imbalance between the input signal and the feedback link, the amplifier valves remain off and the mechanical compression springs 40 and 42 hold the pneumatically actuated three-position, four-way valve 38 in the off position. When the positioner experiences an imbalance in either direction of the hydraulic piston, a pneumatic signal is transmitted to one or the other of the amplifier valves 90 and 92. The appropriate amplifier valve is thereby actuated and communicates the regulated air supply with one or the other of the pneumatic pilots 44 and 46.

If the positioner senses from the feedback link that the piston of the hydraulic cylinder and piston assembly 16 is too low, as shown schematically in FIG. 1, the pneumatic pilot 44 is activated to position the pneumatically actuated three-position, four-way valve 38 in the appropriate open position. Similarly, if the hydraulic piston is too high, the pneumatic pilot 46 is activated. As the feedback link comes into balance with the input signal, the pressure signal from the positioner drops to near zero and is cut off by one of the position signal regulators 86 and 88. With the appropriate amplifier valve thus deactivated, the pneumatically actuated three-position, four-way valve is allowed to return to the closed position under the influence of the mechanical compression springs 40 and 42.

The third function of the signal conditioner 84 is accomplished using the positioner signal outputs from both lines 80 and 82. A shuttle valve 100 receives pneumatic signals from each of the signal lines 80 and 82 without allowing the signal from one line to affect that of the other. In the embodiment of FIG. 2, the pneumatic signal from the shuttle valve 100 is directed to a differential pressure sensor valve 102. The differential pressure sensor valve 102 is selected with a threshold pressure level indicative of a large imbalance between the input control signal and the feedback link. An indicated correction of six percent (6%) of the total travel of the controlled device, such as valve 10, has been used in the preferred embodiment to be an appropriate level for actuating the differential pressure sensor valve 102. Thus, when a large correction in the position of the output shaft 14 is required, the differential pressure sensor valve 102 is activated. As with the amplifier valves 90 and 92, the differential pressure sensor valve 102 is connected to the air supply line 70 through an air supply regulator 104 which operates to preselect the pressure at which valve 54 will allow larger flow to cylinder 16.

The differential pressure sensor valve 102 is normally on in this embodiment. Thus, upon actuation of valve 102, the air supply through the air supply regulator 104 to pilot supply line 105 is cut off. This allows the two-way control valve 54 to open. As discussed above, the opening of the two-way actuator valve 54 increases the flow of hydraulic fluid from the accumulator 26 and the air-driven fixed-displacement pump 18 to the hydraulic cylinder and piston assembly 16 when the pneumatically actuated three-position, four-way valve is open.

The foregoing hydraulic fluid flow control feature is further illustrated in FIG. 4. In FIG. 4, four regulated feed lines 106, 108, 110, and 112 provide four separate flow levels from the hydraulic fluid source to the hydraulic cylinder and piston assembly 16. On three of the four feed lines, two-way control valves 114, 116, and 118 control flow therethrough. These valves are in turn controlled by the differential pressure sensor valves 120, 122 and 124 in a similar fashion to that previously discussed with respect to the differential pressure sensor valve 102 schematically illustrated in FIG. 2. The advantage of a larger number of regulated hydraulic feed lines is that the resulting motion of the piston in the hydraulic cylinder and piston assembly 16 is more directly proportional to the distance from the null point. Naturally, the velocity of the hydraulic piston will still tend to follow a step function as governed by the sequential closure of the restricted feed lines as the piston approaches the null position. The approximation of a response proportional to the distance of the piston from the null position, while retaining the dynamic stability of the hydraulic cylinder output and the speed of the binary pneumatic control signals, may be made further proportional by adding more regulated feed lines and attendant controls.

If pneumatic pressure is lost in the preferred embodiment illustrated in FIG. 1, the pneumatically actuated three-position, four-way valve 38 will assume the closed position because of the mechanical compression springs 40 and 42. As no hydraulic fluid can then enter or leave the hydraulic cylinder and piston assembly 16, the control valve, which is rigidly fixed to the piston of the hydraulic cylinder and piston assembly 16, becomes locked in position.

Figure 3:
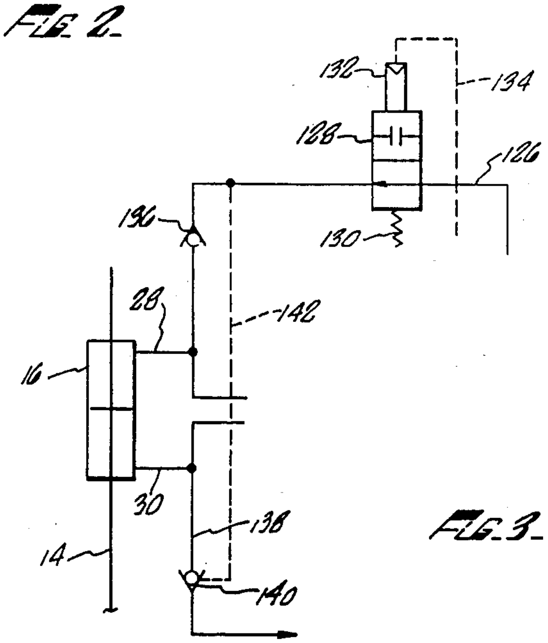
FIG. 3 is a schematic representation of a failure circuit of the present invention which may be selectively employed in the system represented in FIG. 1.

In some applications, this is the preferred failure mode. However, in many applications, it is desirable to shut off flow through the working control valve 10. A system capable of closing (or opening) the working control valve 10 upon pneumatic failure is illustrated in FIG. 3. A failure mode hydraulic cylinder input line 126 is illustrated with a two-way valve 128 mechanically biased by a mechanical compression spring 130 to the open position. A pneumatic signal is communicated to the pneumatic pilot 132 from any point in the air supply where pneumatic failure is likely to first be experienced through a pneumatic pilot line 134. Thus, during normal operation of the actuator system, the two-way valve 128 is closed. Only during pneumatic failure will hydraulic fluid be allowed through input line 126. Because of the reservoir of pressurized fluid in the accumulator 26, one final stroke of the piston in the hydraulic cylinder and piston assembly 16 can be accomplished without the benefit of the air-driven fixed displacement pump 18.

The input line 126 is in direct communication with one side of the hydraulic cylinder and piston assembly through a check valve 136. Under failure condition, pressurized hydraulic fluid from the accumulator 26 will force the piston of the hydraulic cylinder and piston assembly 16 downwardly to its lowermost position (as seen in FIG. 3) through the check valve 136. The piston is prevented from moving upward by the check valve 136, even when all pressure has been relieved in the accumulator 26.

To allow the necessary venting of the lower side of the piston of the hydraulic cylinder and piston assembly 16, a failure mode hydraulic cylinder exhaust line 138 extends from the hydraulic cylinder input line 30 to the hydraulic reservoir 32. A pilot-operated check valve 140 prevents flow from the lower half of the cylinder 16 to the hydraulic reservoir 32 during normal operation. Under failure condition, hydraulic pressure in the input line 126 is conveyed to the pilot-operated check valve 140 through a hydraulic pilot line 142. The check valve 140 is thus unseated and hydraulic fluid can be exhausted from the lower side of the hydraulic cylinder and piston assembly 16. By the system illustrated in FIG. 3, the actuator system may be employed to position and then hold indefinitely a working valve under failure conditions.

The system as illustrated in FIG. 3 can also be employed for hydraulic failures as well. To protect against hydraulic failure, the pneumatic pilot line 134 extends from the air supply through a control valve which is actuated by hydraulic pressure from the air-driven fixed-displacement pump 18. The control valve is of the type which upon loss of preselected hydraulic pressure will block input air and vent the pressurized air in the pneumatic pilot line 134. A check valve is placed in the hydraulic line to prevent flow from the accumulator 26 toward the air-driven fixed-displacement pump 18 and toward the control valve controlling air to the pneumatic pilot line 134.

The present system provides, when properly constructed, a very quick response to imbalances in the positioner 72. For maximum performance, the pneumatic system should employ components requiring as little operating pressure as possible to activate. Because of the binary nature of the pneumatic control over the hydraulic system and the use of amplification circuitry, large operating pressures are not required. Reduction in the system air volume also helps response time and accuracy because of the compressible nature of the pneumatic fluid.

Using available components modified to have minimum pilot volumes and assuming that the regulator 60 air supply 62 will be at 75 psig, the hydraulic system may be maintained at 3,000 psig. The pneumatically actuated three-position, four-way valve 38 may be selected to have a response time of 0.01 second, while the amplifier valves 90 and 92 may each be selected to have a response time of 0.01 second. Time delays in the positioner and delays resulting from fluid velocities in the lines to the pneumatically actuated three-position, four-way valve 38 may account for as much as 0.03 seconds delay. Thus, the total response time of the pneumatic system to initiate operation of the hydraulic system may be designed to 0.05 seconds.

The adjustable flow control valve 52 may be adjusted such that the low speed rate of the hydraulic cylinder and piston assembly 16 is 0.25 inches per second. The accuracy of the system may then be calculated by multiplying the time delay with the piston rate, 0.05 sec×0.25 in/sec=0.0125 in. If the total stroke of the mechanism is 10 inches, the accuracy at the slow piston speed, which is always the speed employed proximate to the null zone, is thirteen-hundredths percent (0.13%). This allows a dynamically stable positioning capability with a response and accuracy not found in conventional pneumatic valve actuators.

Thus, a pneumatic-hydraulic actuator system is disclosed which advantageously employs the two fluid systems to the best advantage of each, providing a highly responsive and accurate system. While embodiments and applications of this invention have been shown and described, it would be apparent to those skilled in the art that many more modifications are possible without departing from the inventive concepts herein described. The invention, therefore, is not to be restrictive except by the spirit of the appended claims.

What is claimed is:

1. A valve actuator system comprising:

pressure source means including an accumulator charged to a predetermined pressure;

piston means connectable to a valve control member for providing linear motion in response to pressure applied from said pressure source means;

positioner means for establishing control signals in response to differences between input signals to said positioner means indicative of desired valve positions, and feedback signals to said positioner means indicative of actual valve positions; and means for moving said piston means at one of two speeds in response to the magnitude of the control signals from said positioner means including a restrictor and by-pass assembly connected between said accumulator and said piston means to provide two different fluid flow volumes depending on the magnitude of the control signals from said positioner means.

2. A valve actuator system as set forth in claim 1 wherein said pressure source means includes:

an air-actuated hydraulic pump; and said accumulator is connected to said air-actuated hydraulic pump to be hydraulically charged to said predetermined pressure by said pump.

3. A valve actuator system as set forth in claim 2 including a three-position valve connected between said accumulator and said moving means having a first position responsive to a first control signal for preventing flow from said accumulator to said piston means, a second position responsive to a second control signal for allowing flow from said accumulator to one side of said piston means to cause linear motion in a first direction, and a third position responsive to a third control signal for allowing flow from said accumulator to the opposite side of said piston means to cause linear motion in a second direction opposite said first position.

4. A valve actuator system as set forth in claim 3 wherein said positioner means includes:

input signal means for establishing a signal indicative of desired control valve position;

feedback signal means for establishing a signal indicative of actual valve position a control unit for comparing the signal from said input means with the signal from said feedback means and applying the first control signal to said valve when said input signal is identical to said feedback signal, the second control signal to said valve when said input signal is less than said feedback signal, and the third control signal to said valve when said input signal is greater than said feedback signal, the magnitude of said second and third control signals being dependent upon the difference between desired and actual control valve position.

5. A valve actuator system as set forth in claim 1 wherein said restricted and by-pass assembly includes:

a restrictor orifice mounted between said accumulator and said piston means;

a by-pass line connected across said restrictor orifice, and a two-position valve mounted in said by-pass line to prevent flow therethrough in a first position while allowing flow therethrough in a second position.

* * * * *